United States Patent [19]

Adolfsson

[11] Patent Number: 4,693,351

[45] Date of Patent: Sep. 15, 1987

[54] REVERSIBLE FREEWHEEL DEVICE

[75] Inventor: Rune Adolfsson, Borås, Sweden

[73] Assignee: SKF Nova AB, Gothenburg, Sweden

[21] Appl. No.: 877,138

[22] Filed: Jun. 23, 1986

[30] Foreign Application Priority Data

Aug. 30, 1985 [SE] Sweden ................................ 8504032

[51] Int. Cl.$^4$ .............................................. F16D 41/08
[52] U.S. Cl. .................................. 192/48.92; 192/35;
192/43.1; 192/45.2; 192/51
[58] Field of Search ...................... 192/43, 43.1, 41 A,
192/43.2, 45.2, 35, 36, 48.92, 51

[56] References Cited

U.S. PATENT DOCUMENTS

| | | | |
|---|---|---|---|
| 2,427,120 | 9/1947 | Blair | 192/43 |
| 2,591,993 | 4/1952 | Aijala | 198/43.1 X |
| 3,314,510 | 4/1967 | Zlotek | 192/43.1 X |
| 3,907,083 | 9/1975 | Nieder | 192/43 |
| 4,284,183 | 8/1981 | Brisabois | 192/48.92 |

FOREIGN PATENT DOCUMENTS 1356780 2/1964 France .

Primary Examiner—George H. Krizmanich
Attorney, Agent, or Firm—Eugene E. Renz, Jr.

[57] ABSTRACT

A freewheel device with freewheeling and locking effect in both directions of rotation can be produced easily and inexpensively by the use of conventional sprags designed for use in uni-directional freewheel devices. Two sets of sprags are provided between the inner and the outer raceway of the device, one for each direction of rotation. The sprags are spring loaded for taking positions in which they do not contact one raceway, and a cage which is braked during rotation is provided to be brought in rotation by the sprags and thereby influence the sprags against the spring force to taking a position in which they contact both raceways, the two sets of sprags being alternately engaged or disengaged depending on the direction or rotation of the device.

1 Claim, 3 Drawing Figures

REVERSIBLE FREEWHEEL DEVICE

FIELD OF THE INVENTION

The present invention relates to freewheeling mechanisms and particularly to a reversible freewheeling assembly having a freewheeling and locking effect in both directions of rotation.

Such a device is known by e.g. the French patent publication No. 1356780. The device is provided with a number of sprags, each having three clamping surfaces. A first clamping surface is always in cooperative relation with one of the raceways between which the sprags are arranged and the two other second and third clamping surfaces cooperate alternately with the other raceway. One of the last mentioned second and third clamping surfaces is in operation when the rotating part of the device is rotating in one direction and the other clamping surface is in operation when the direction of rotation is opposite.

Such sprags with three clamping surfaces are difficult to manufacture and are different from such conventional sprags which are used in irreversible freewheel devices, which sprags have only two clamping surfaces each.

SUMMARY OF THE INVENTION

With the foregoing in mind, it is an object of the present invention to provide a reversible freewheeling assembly characterized by novel features of construction and arrangement which utilizes so-called conventional sprags and thereby simplifies the manufacture thereof in that the assembly comprises simple and inexpensive parts which can be produced at very low cost. To this end, the device comprises a pair of annular drive and driven members having confronting raceways, a plurality of sprags, means for biasing some of the sprags in one freewheeling direction and for biasing others of the sprags in an opposite freewheeling direction, and a braking cage operative when the drive and driven member are rotated relative to one another in one direction to influence some of the sprags so that they are urged against the spring force into contacting both raceways and thereby establish a locking effect and a driving connection and wherein the other sprags are disposed in a freewheeling state. Relative rotation of the drive and driven members in the opposite direction effecting a reverse rotation of the sprags thereby providing an assembly which has a freewheeling and locking effect in both directions of rotation.

Such a device can be provided with conventional sprags which are used in common irreversible freewheel devices, and other elements of the device are uncomplicated and inexpensive to manufacture.

BRIEF DESCRIPTION OF THE DRAWING

The following is a detailed description of the invention with reference to the accompanying drawing, in which.

DESCRIPTION OF THE PREFERRED EMBODIMENTS

Figure 1:
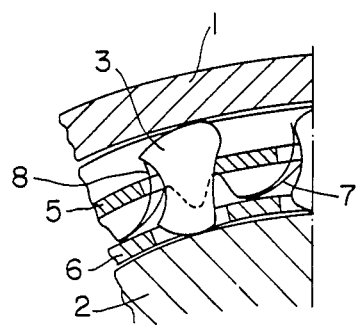
FIGS. 1 and 2 show sections according to I—I and II—II in FIG. 3.
Figure 2:
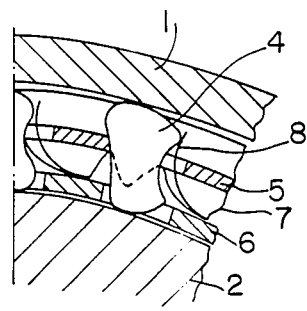
Figure 3:
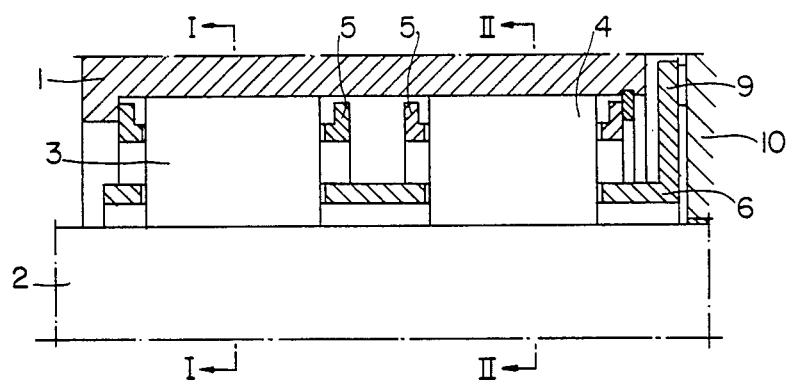
FIG. 3 shows a longitudinal section of a portion of a freewheel device according to one embodiment of the invention.

The device comprises two rotatable elements 1, 2, one of which having an outer and the other one having an inner raceway. The raceways are concentrical, and a number of sprags 3, 4 are provided in the annular space between them. The sprags are guided by cages 5. One of the rotatable elements 1 is connected to a driving member, e.g. a drive shaft from an engine, and the other element 2 is connected to a driven member, e.g. a wheel. Thanks to the freewheel device the driven member can be permitted to rotate faster than the driving member without the driving member being forced to participate in the faster rotation. In a reversible freewheel device this effect is achieved during driving in both directions of rotation. According to the present invention one set of sprags 3 is arranged for operation in one direction of rotation (counterclockwise in the embodiment shown), and another set of sprags 4 is arranged for operation in the opposite direction of rotation (clockwise in the embodiment shown). This is achieved by the fact that the sprags are subjected to a spring force for taking a position in which they are out of contact with one raceway and that a cage 6, which is braked during rotation, is arranged to be brought to rotate by the sprags and thereby influence the sprags so that they are moved against the spring force into a positon where they contact both raceways, only one set of sprags being brought into contact with both raceways during rotation in one direction, and only the other set of sprags being brought into contact with both raceways during rotation in the opposite direction.

The spring loading of the sprags can be brought about by a ring 7 of a resilient material. The ring is provided with openings in which the sprags are arranged. The ring is also provided with resilient tongues 8 which contact the sprags, tending to turn the sprags so that they lose contact with one raceway. In the embodiment shown, they lose contact with the inner raceway, whereas they keep contacting the other raceway.

Both sets of sprags are thus disengaged if they are not subjected to other forces than those caused by the tongues 8. In order to make the device torque-transmitting, one set of sprags must be in contact with both raceways, and this is brought about by the cage 6. The sprags 3, 4 follow the rotation of element 1 by contacting this element and/or by the fact that the cage 5 is brought to rotate together with element 1 by means of friction or possibly another kind of connection to element 1. The rotation of the cage 6 together with element 1 and the sprags is braked by the fact that a portion 9 of the cage frictionally engages a non-rotating member 10, e.g. a housing for the freewheel device. The cage 6 surrounds the sprags 3, 4 near their contact with one raceway, which is the inner raceway in the embodiment shown. When the device is rotating in one direction, one set of sprags will be turned by their contact with the cage 6 against the influence of the tongues 8 into contact with both raceways, whereas the sprags of the other set are not influenced by the cage or they are influenced so that they tend to be turned in the direction of the spring force of the tongues 8 into a disengaged position. When the device is rotated in the opposite direction, the last mentioned set of sprags ie engaged, and the first set is disengaged. In the described embodiment the two sets of sprags are arranged in two rows side by side, the two sets forming one row each.

Thereby two rows with identical sprags and identical resilient rings 7 can be used. The sprags and the rings of the two rows are arranged oppositely. The cage 6 is common.

It is also possible to place all the sprags in one row, whereby they can be alternately arranged. In such an arrangement the tongues 8 of the resilient ring 7 must also be alternately arranged accordingly. This arrangement saves space axially but requires more radial space.

In order to avoid requirements for narrow tolerances in the manufacturing process for the cage 6, resilient elements may possibly be arranged in the contact between the cage and the sprags, whereby the sprags are resiliently pressed into engaging position by the braked cage.

When the driving element in the device is immobile, the driven element may in many cases suitably be allowed to rotate freely in both directions. This can be achieved by making the brake of the cage 6 such that the braking force ceases during standstill, e.g. by providing a hydrodynamic brake instead of a friction brake. Thereby the resilient tongues 8 can easily press all the sprags 3, 4 into disengagement when the cage 6 is not rotating.

The tongues 8 can be integral with the cage 5 instead of being a part of a separate ring 7. As an alternative, the ring 7 may be designed to act also as a cage, whereby the cage 5 is superfluous.

What is claimed is:

1. A reversible freewheel assembly having freewheeling and locking in both directions of rotation comprising drive and driven members having confronting raceways, a plurality of sprags in the annular space between the raceways disposed in a pair of side-by-side rows, the sprags in the rows being oriented in opposite directions, a cage for circumferentially spacing the sprags including biasing means normally biasing the sprags into contact with only one of the raceways to a freewheeling position, a braking ring operatively associated with all the sprags and means providing light contacting engagement with a portion of said braking ring whereby upon relative rotation of said drive and driven members in one direction, the sprags of said one row are moved by said braking ring against the biasing force into contact with both raceways and whereby relative rotation of said drive and driven members in the opposite direction, the braking ring effects contact of the sprags in the opposite row with both raceways.

* * * * *